Nov. 9, 1965 S. E. HAGERTY ETAL 3,216,533
BRAKE ADJUSTER WITH OVER-TRAVEL FEATURE
Filed May 15, 1963 4 Sheets-Sheet 1
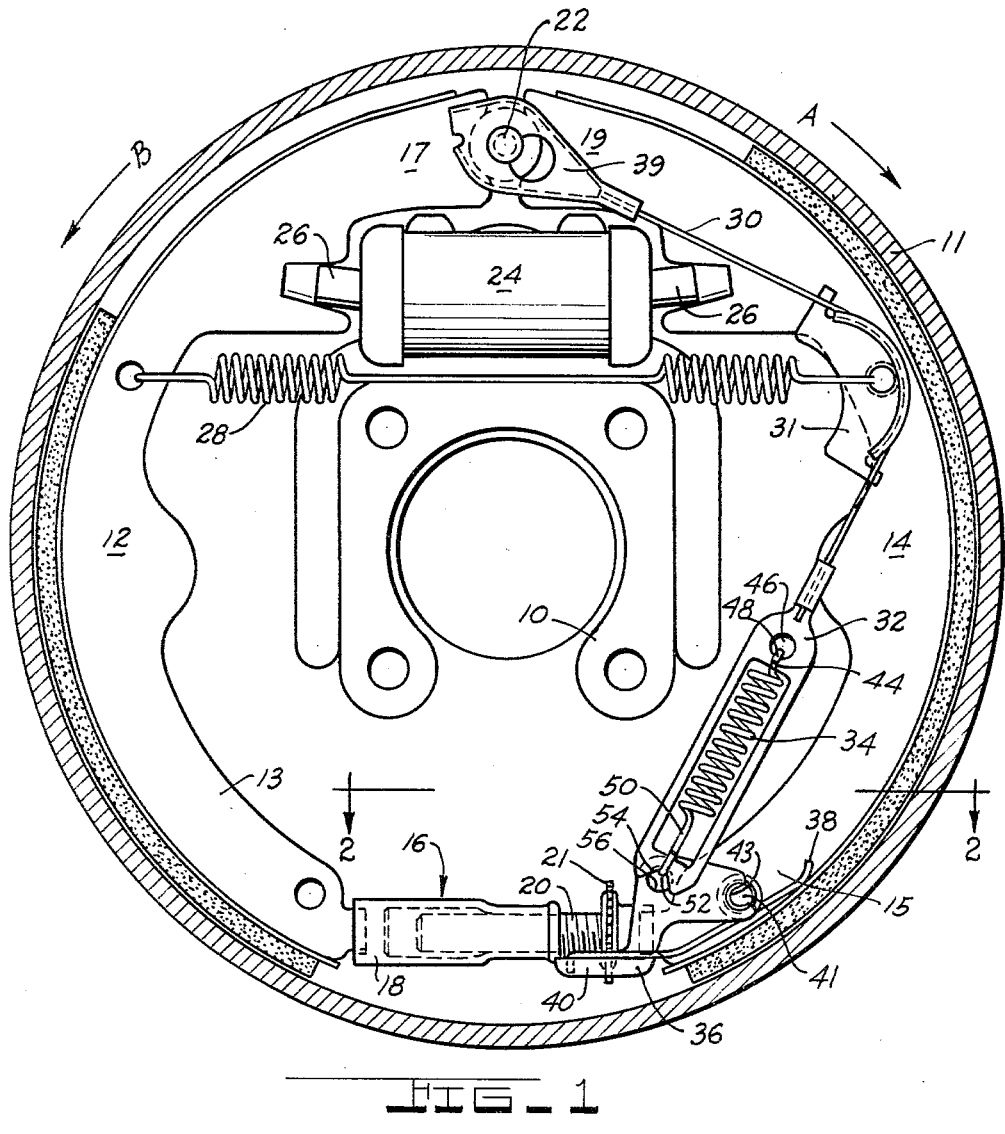
FIG_1
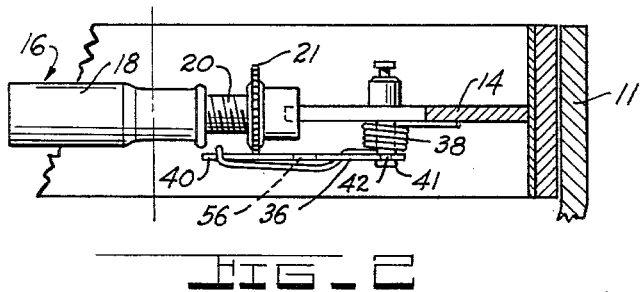
FIG_2
INVENTORS
RICHARD T. BURNETT.
SIDNEY E. HAGERTY.
EDWARD A. ROSS.
DONALD D. JOHANNESEN.
BY- Sheldon F. Raizes
ATTORNEY.

Nov. 9, 1965 S. E. HAGERTY ETAL 3,216,533
BRAKE ADJUSTER WITH OVER-TRAVEL FEATURE
Filed May 15, 1963 4 Sheets-Sheet 2
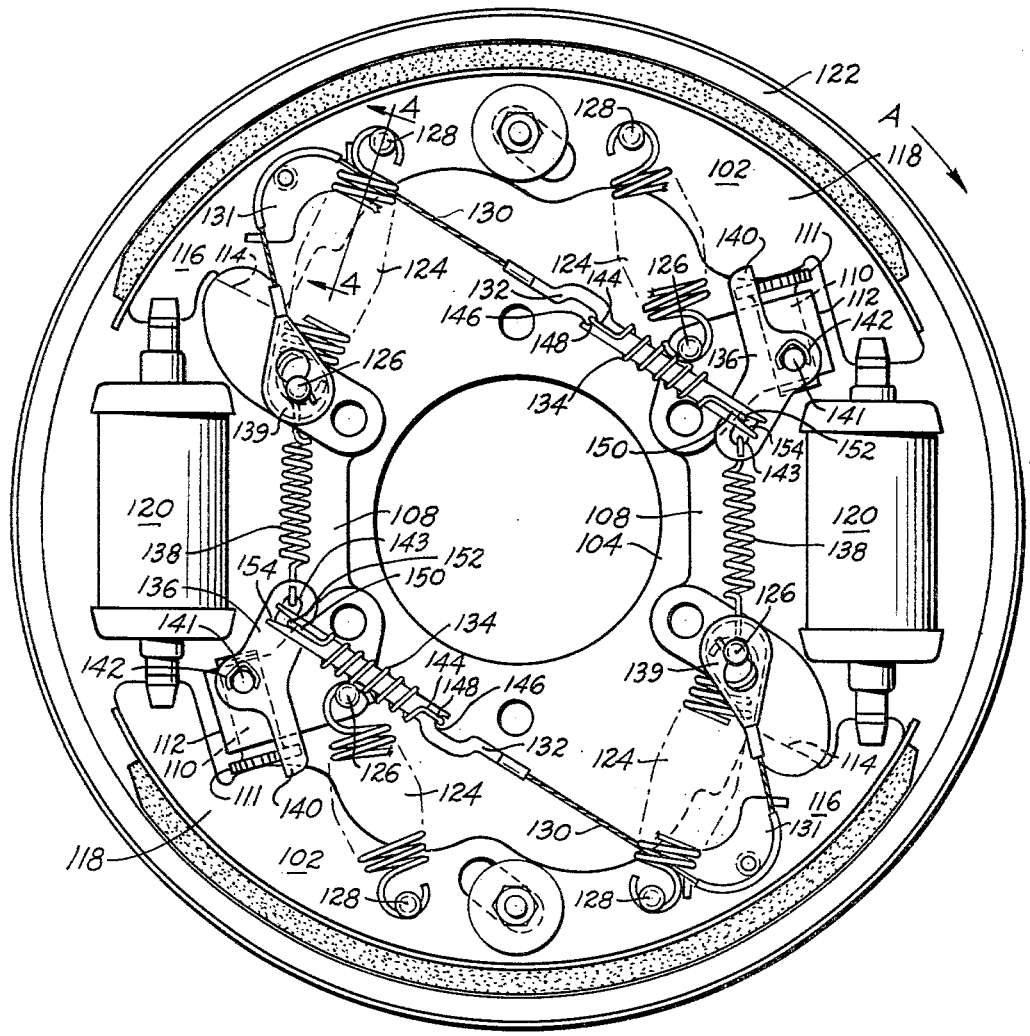
FIG_3
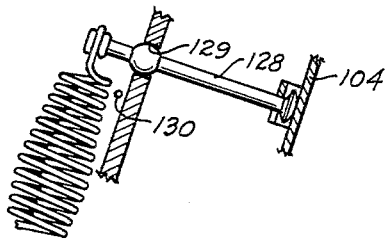
FIG_4
INVENTORS
RICHARD T. BURNETT.
SIDNEY E. HAGERTY.
EDWARD A. ROSS.
DONALD D. JOHANNESEN.
BY Sheldon F. Raizes
ATTORNEY.

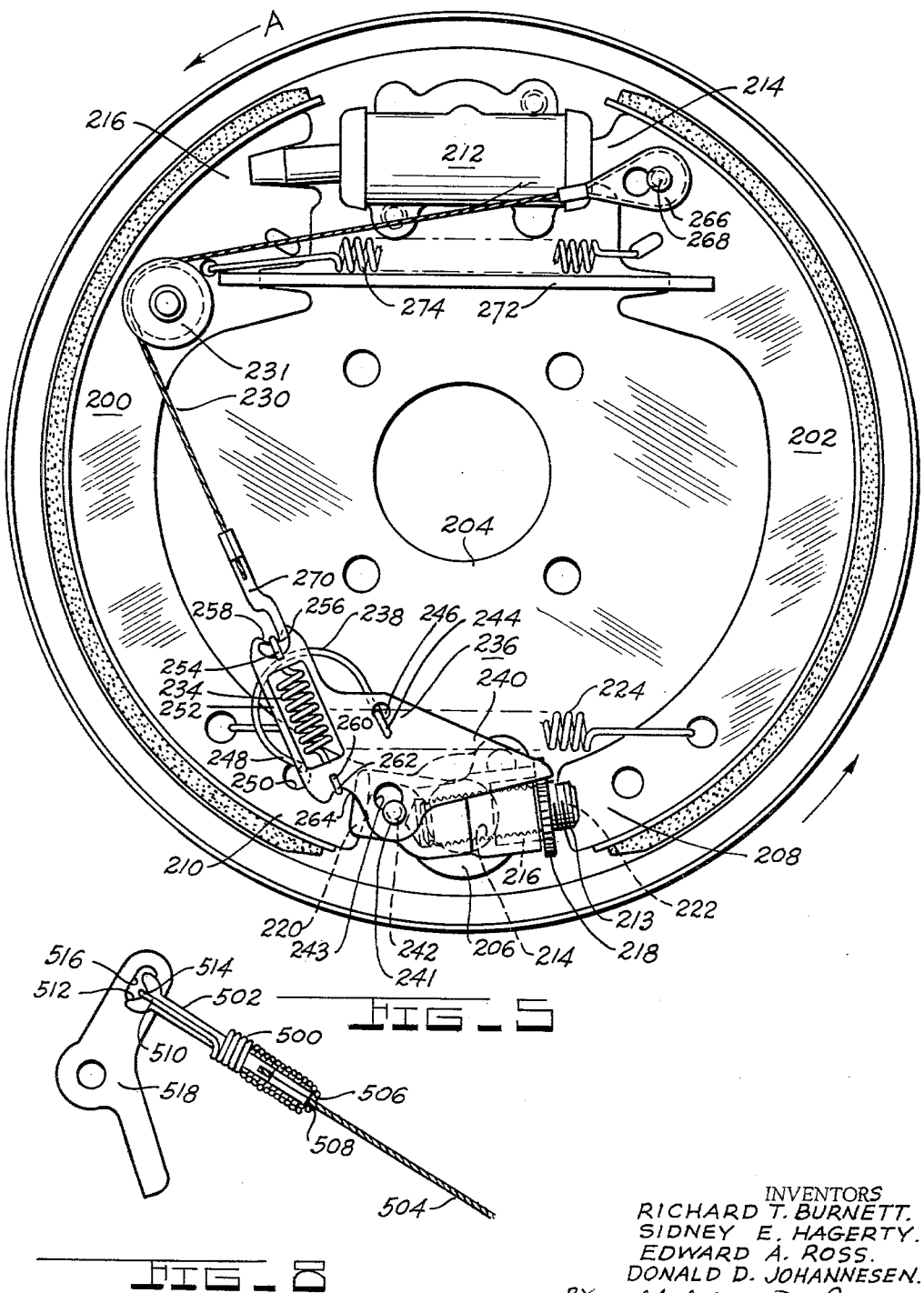

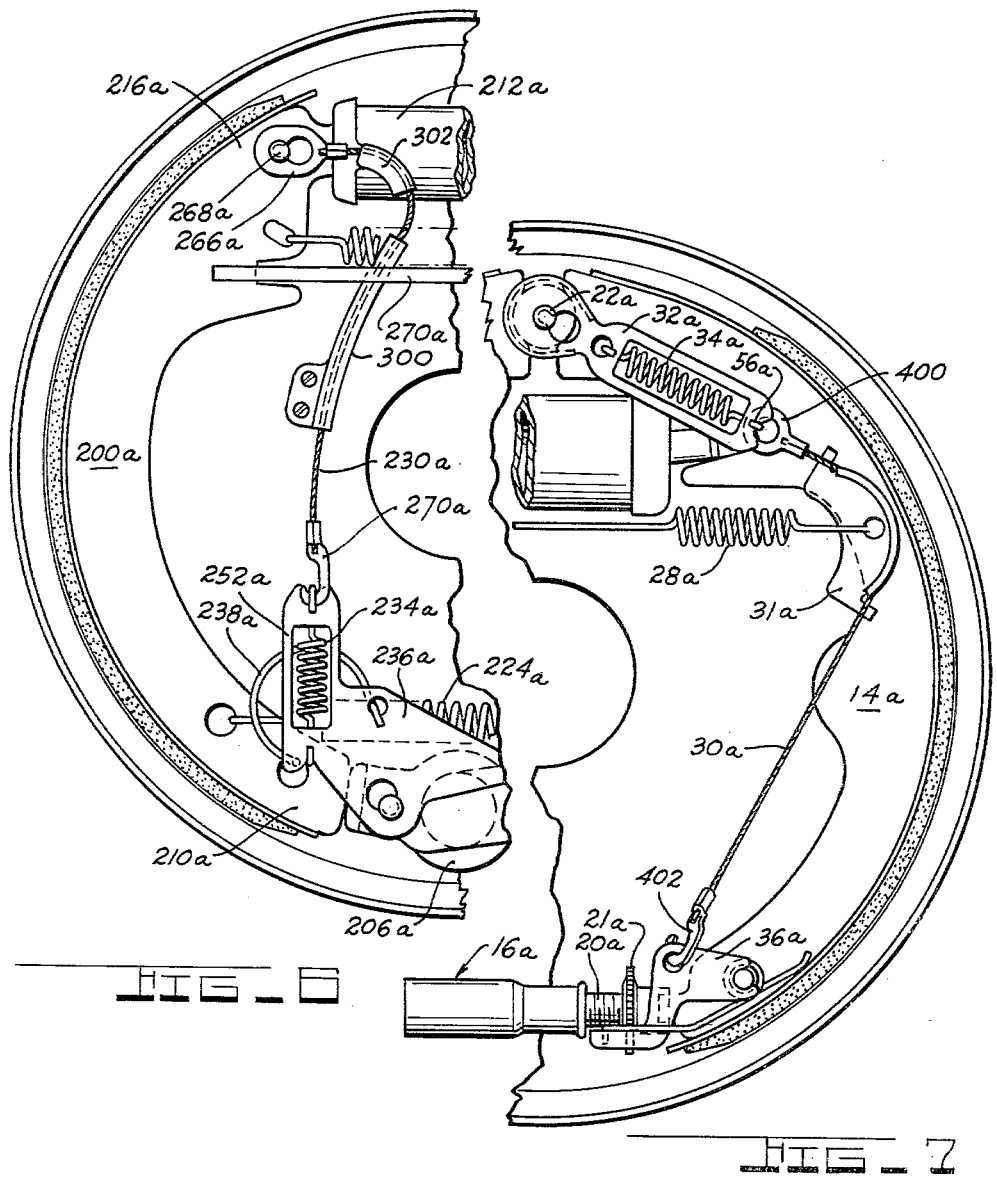

United States Patent Office 3,216,533
Patented Nov. 9, 1965

3,216,533
BRAKE ADJUSTER WITH OVER-TRAVEL
FEATURE
Sidney E. Hagerty, Edward A. Ross, Richard T. Burnett, and Donald D. Johannesen, South Bend, Ind., assignors to The Bendix Corporation, South Bend, Ind., a corporation of Delaware
Filed May 15, 1963, Ser. No. 280,661
15 Claims. (Cl. 188—79.5)

This invention relates to an automatic adjuster for a drum brake.

One of the objects of this invention is to provide a drum brake with an automatic adjusting mechanism to compensate for lining wear during brake actuation.

Another object of this invention is to provide a drum brake with an automatic adjuster which adjusts the brake during brake actuation.

A further object of this invention is to provide an automatic adjusting mechanism for a drum brake with over-travel means.

Still another object of this invention is to provide a drum brake with an automatic adjuster which will effect uniform results on brakes which are assembled in mass production with a minimum of expense involved.

Other objects of the invention will become apparent to those skilled in the art from the following description with reference to the accompanying drawings wherein:

FIGURE 1 is an elevational view of a servo brake illustrating one embodiment of the invention;

FIGURE 2 is a view taken along section line 2—2 of FIGURE 1;

FIGURE 3 is an elevational view of a different type of brake assembly illustrating another embodiment of the invention;

FIGURE 4 is a view taken along section line 4—4 of FIG. 3;

FIGURE 5 is a view of another brake assembly illustrating still another embodiment of the invention;

FIGURE 6 is a partial view of a brake assembly of the type illustrated in FIGURE 5 illustrating still another embodiment of the invention;

FIGURE 7 is a partial view of the brake assembly of FIG. 1 illustrating still another embodiment of the invention; and FIGURE 8 is a view of another embodiment of the invention.

Referring to FIG. 1, a backing plate 10 is adapted to be mounted to a fixed part of a vehicle such as an axle flange (not shown). A pair of brake shoes 12 and 14 is slidably mounted on the backing plate 10 and the shoes are interconnected at one pair of adjacent ends 13, 15 by an adjusting strut 16 which comprises an adjusting screw nut 18 and a rotatable adjusting screw 20 having a serrated wheel 21 integral therewith. The adjusting screw nut 18 is fixed to the end 13 of the brake shoe 12 and the adjusting screw 20 is rotatably mounted on the end 15 of the brake shoe 14. An anchor pin 22 is fixed to the backing plate 10 and disposed between the other ends 17 and 19 of the brake shoes and a fluid motor 24 has a pair of links 26 connected to the webs of each shoe for spreading the shoes into engagement with the brake drum 11. A shoe-to-shoe return spring 28 serves to retract the brake shoes against the anchor pin 22 to their brake release position.

An automatic adjusting mechanism is provided and comprises a cable 30, a guide 31, a cage member 32, an over-travel spring 34, a lever 36 and a lever return torsion spring 38. A metal retainer 39 is connected to one end of the cable 30 and fastens the cable to the anchor pin 22. The cable 30 is slidably guided intermediate its ends on the shoe 14 by the guide member 31 and has the cage member 32 attached to its other end.

A finger 40 of the lever 36 is positioned adjacent the serrated wheel 21 and is adapted to rotate the same upon clockwise movement of the lever 36. The lever 36 pivots about a pin 41 which extends axially from the web of the shoe 14 and which has a groove 42 on which the curved surface 43 on one end of the lever 36 bears. The torsion spring 38 is wound around the pin 41 intermediate the ends thereof with one end of the torsion spring 38 bearing against the rim of the shoe 14 and the other end of the torsion spring 38 bearing against the finger 40 of the lever 36 to bias the lever 36 in a counterclockwise direction. The over-travel spring 34 has a hooked end 44 extending through an opening 46 in the cage member 32 and bearing at point 48 on the edge of the opening 46 and has another hooked end 50 bearing at point 52 on the edge of a guide slot 54 located at one end of the cage member 32. The over-travel spring 34 is so constructed as to be pre-stressed to a minimum predetermined strength, which is greater than the strength of the lever return torsion spring 38, when the over-travel spring is connected to the cage 32. The end 50 of the spring 34 extends through an opening 56 in the lever 36. Due to a counterclockwise biasing force exerted on the lever 36 by the torsion spring 38, the edge of the opening 56 engages the hooked end 50 of the spring 34 to maintain the cable 30 in a taut condition and to define a normally retracted position of the lever 36, since the over-travel spring 34 and the cable 30 will act as one member until force on the spring is greater than the pre-stressed amount, which force will not be exceeded until application of the brake.

Upon brake application by actuation of the fluid motor 24, and assuming rotation of the brake drum in the direction of the arrow A, the shoes 12 and 14 will be spread until they engage the brake drum 11 at which time the brake drum will tend to carry the shoe 14 therewith. The rotational force on the brake shoe 14 will be transmitted through the strut 16 to the brake shoe 12 whereupon the end 17 of the brake shoe 12 will engage the anchor 22. The movement of the shoe 14 and the guide member 31 will cause pulling by the cable 30 and spring 34 on the lever 36 effecting rotation of the lever 36 about the pivot pin 41 and thus rotation of the serrated wheel 21.

There is a point during brake application wherein the force of the brake shoe 14 bearing on the strut 16 will be so great as to prevent further rotation of the adjusting screw 20 by the serrated wheel 21. This will happen while the brake shoe 14 and the guide 31 are moving relative to the cable 30 still effecting a pulling force by the cable 30 on the lever 36 to rotate the same. However, due to the pre-stressed over-travel spring 34, any further pulling force exerted by the cable 30 will result in the cable 30 and the cage 32 moving relative to the lever 36 against the force of the over-travel spring 34, thereby preventing damage to the adjusting mechanism or breakage thereof when the adjusting screw and the screw nut bind due to the forces exerted thereon by the brake shoe 14.

FIGURE 3

Referring to FIG. 3, another type of brake assembly is illustrated which includes a modified embodiment of the automatic adjuster shown in FIG. 1.

A pair of brake shoes 102 is slidably mounted on a backing plate 104 and a pair of castings 108 is located between adjacent ends of the shoes and the castings are also mounted to the backing plate. A rotatable adjusting screw 110 having a serrated wheel 111 is threadedly received within a boss 112 located on each casting 108. The ends 116 of each brake shoe anchor on a respective anchoring surface 114 provided on each casting and the ends 118 of each brake shoe anchor on a respective serrated wheel 111. A pair of wheel cylinders 120 is located between the adjacent ends of the brake shoes and is capable of spreading the brake shoes into engagement with a rotatable drum 122 upon fluid actuation. Four shoe return springs 124 are provided with each one being secured at one end to a respective one of a plurality of stationary pins 126 secured to the castings 108 and secured at the other end to respective one of a plurality of toggle pins 128. Each toggle pin 128 has one end pivotally mounted to the backing plate 104 and extends through an opening 129 in their respective brake shoes. The pins 128 bear on the edge of the opening 129 to transmit the force from the return spring 124 to each shoe to return the same to its normally retracted position.

An automatic adjusting mechanism is provided and comprises a cable 130, a guide 131, a flat spring retainer or carrier 132, an over-travel spring 134, a lever 136 and a return spring 138. A pair of metal retainers 139 is connected to one end of a respective cable 130 and fastens each cable to a respective stationary pin 126. Each cable 130 is slidably guided intermediate its ends on its respective guide shoes by a guide 131 and has a carrier member 132 connected to its other end. A finger 140 of the lever 136 is positioned adjacent the serrated wheel 111 and is adapted to rotate the same upon clockwise movement of the lever 136. The lever 136 pivots about a pin 141 which extends axially from the boss 112 and is retained on the pin 141 by a washer 142. One end of the lever return spring 138 hooks onto an edge of an opening 143 of the lever 136 and has its other end hooked onto the pin 126 to effect a counterclockwise biasing force on the lever 136. Each over-travel spring 134 is coiled around its respective carrier 132 and has a hooked end 144 extending through an opening 146 of the carrier 132 and bearing at point 148 on the edge of the opening and has another hooked end 150 bearing at point 152 on the edge of a guide slot 154. The spring is so constructed as to be pre-stressed to a minimum predetermined strength which is greater than the strength of the return spring 138, when the spring 134 is connected to the carrier member 132. The end 150 of the spring 134 also extends through the opening 143 of the lever 136. Due to the counterclockwise biasing force exerted on each lever 136 by their respective return spring 138, the edge of the opening 143 engages the hooked end 150 of the spring 134 thereby maintaining the cable 130 in a taut condition and defining the normally retracted position of the lever 136 since the spring 134 and the cable 130 will act as one member until the force on the spring is greater than the pre-stressed amount, which force will not be exceeded until brake application.

Upon brake application by the actuation of the fluid motor 120, and assuming rotation of the brake drum in the direction of the arrow A, the shoes 102 will be spread until they engage the brake drum 122 at which time the brake shoes will anchor on the serrated wheels 111.

The movement of each shoe 102 and the guide members 131 will cause pulling by each cable 130 and its over-travel spring 134 on the respective levers 136 effecting rotation of the levers 136 about their pivot pin 141 and thus rotation of each serrated wheel 111. There is a point during brake application wherein the force of the brake shoes 102 bearing on their respective adjusting screws 110 will be so great as to prevent further rotation of each adjusting screw 110 and its serrated wheel 111. This will happen while the brake shoes 102 and the guides 131 are moving relative to their respective cables 130 still effecting a pulling force by the cable 130 on the lever 136 to rotate the same. However, due to the pre-stressed over-travel spring 134 any further pulling force exerted by each cable will result in each cable 130 and their respective carrier 132 moving relative to the lever 136 against the force of the over-travel spring 134, thereby preventing damage to the adjusting mechanism or breakage thereof when the adjusting screw binds due to the forces exerted thereon by the brake shoes.

FIGURE 5

Referring to FIG. 5, there is illustrated another type of brake assembly illustrating another embodiment of automatic adjuster which incorporates the same principle as the previous embodiments. A pair of brake shoes 200 and 202 is slidably mounted on a backing plate 204 which has mounted thereon a stationary anchor casting 206 between one pair of adjacent shoe ends 208 and 210 and a wheel cylinder 212 mounted between the other pair of adjacent ends 214 and 216. A non-rotatable screw 213 is slidably received within a counterbored opening 214 and an internally threaded sleeve 216 mating with the threads of the screw 213, is rotatably received within the opening 214 of the casting 216 and has a serrated wheel 218 integrally connected thereto for rotating the sleeve and thereby effecting longitudinal movement of the screw 213. The end 210 of the shoe 200 is slidably received within a slot 220 of the casting and the end 208 of the shoe 202 is slidably received within a slot 222 of the adjusting screw 213. A spring 224 retains the ends 208 and 210 in engagement with the anchor. An automatic adjusting mechanism is provided and comprises a cable 230, a pulley 231, an over-travel spring 234, a lever 236, and a lever return spring 238. One end of the lever 236 is positioned adjacent the serrated wheel 218 and is adapted to rotate the same upon clockwise movement of the lever 236. The lever 236 pivots about a pin 241 which extends axially from the anchor block 206 and has a groove 242 on which the edge of a multi-circular opening 243 bears. The return spring 238 has one end 244 extending through an opening 246 of the lever 236 and its other end 248 extending through an opening 250 of the brake shoe. The return spring is constructed and the ends thereof placed in their respective openings in such a way as to bias the lever 236 in a counterclockwise direction.

A cage structure 252 is provided for the over-travel spring 234 at the other end of the lever 236. The over-travel spring 234 has a hooked end 254 bearing at point 256 on the edge of a guide slot 258 on one end of the lever 236 and has another hooked end 260 bearing at point 262 on the edge of another guide slot 264. The spring is so constructed as to be pre-stressed to a minimum predetermined strength, which is greater than the strength of the return spring 238, when the spring 234 is connected to its cage structure 252. A metal retainer 266 is connected to one end of the cable 230 and fastens the cable to a pin 268 which extends axially from the web of the brake shoe 202. The cable 230 engages the pulley 231 intermediate its ends thereof and has a hook 270 connected to its other end which is adapted to be engaged by the hooked end 254 of the over-travel spring 234. Due to the counterclockwise biasing force exerted on the lever 236 and by the return spring 238 the hooked end 254 of the over-travel spring 234 engages the hooked end 270 of the cable 230 thereby maintaining the cable 230 in a taut condition and defining the normally retracted position of the lever 236 since the cable 230 and the spring 134 will act as one member until the force on the over-travel spring 234 is greater than the pre-stressed amount, which force is not exceeded until during brake application. A rigid strut 272 interconnects the shoe ends 214 and 216 and a shoe return spring 274 connected to each shoe holds each shoe in engagement with the strut 272 during brake released position.

In operation, assuming rotation of the brake drum in the direction of arrow A, the shoes 200 and 202 will be spread by the wheel cylinder 212 into the brake drum with each shoe anchoring on the anchor block 206. The movement of each shoe 200 and 202 will cause pulling by the cable 230 and the over-travel spring 234 on the lever 236 effecting rotation of the lever 236 about the pivot pin 241 and thus rotation of the serrated wheel 218. There is a point during brake application wherein the force of the brake shoe 202 bearing on the screw 213 will be so great as to prevent further rotation of the sleeve 216 and the serrated wheel 218. This will happen while the brake shoes are moving and still effecting a pulling force by the cable 230 on the lever 236 to rotate the same. However, due to the pre-stressed over-travel spring 234, any further pulling force exerted by the cable will result in the hooked end 270 and the hooked end 254 of the spring 234 moving relative to the cage structure 252 against the force of the spring 234, thereby preventing damage to the adjusting mechanism or breakage thereof when the sleeve 216 binds due to the forces exerted thereon by the shoe 202. The rotation of the serrated wheel 218 causes rotation of the sleeve 216 and longitudinal movement of the screw 213 out of the counterbored opening 214 to adjust the position of the brake shoe 202. The new position of the brake shoe 202 is then transmitted through the strut 272 to the brake shoe 200 to adjust the position of the brake shoe 200 relative to the drum when the return spring 274 returns the brake shoes against the strut 272 upon release of the brake.

FIGURE 6

Referring to the embodiment of FIG. 6, there is shown a partial view of the brake of FIG. 5 with those elements being the same as that in FIG. 5 being designated by the same reference numerals with a small *a* affixed thereto. The difference between this embodiment and that of FIGURE 5 lies in the manner of actuating the cable 230a. A guide member 300 slidably receives the cable 230a and extends beneath the strut 270a and the spring 272a. A second guide member 302 is integral with the wheel cylinder casting 212a and slidably receives the cable 230a therethrough. The retainer member 266a connected to the cable 230a is connected to the shoe 200a by a pin 268a.

In operation, upon spreading of the shoe end 216a of the shoe 200a, the cable will be moved relative to its guides 302 and 300 to effect turning movement of the lever 236a.

FIGURE 7

Referring to the embodiment of FIG. 7, a partial view of the brake assembly illustrated in FIG. 1 is shown with similar elements thereto being designated by the same reference numerals with a small letter *a* affixed thereto. The difference between this embodiment and the embodiment of FIGURE 1 lies in the location of the cage structure 32a. The cage structure is connected directly to the anchor pin 22a and then the cable 30a is connected at one end by an eyelet 400 to the end of the spring 56a and is hooked at its other end through hook 402 to the lever 36a. Upon operation, the cage 32a, the spring 34a and the cable 30a will act as a single unit in transmitting a pull on the lever 36a until the lever is prevented from further movement at which time the cable will be allowed to pull against the force of the over-travel spring 34a.

FIGURE 8

Referring to FIG. 8, there is illustrated another embodiment of an over-travel spring and lever arrangement which may be incorporated in any of the type of brakes previously illustrated. An over-travel coil spring 500 surrounds a spring carrier 502 which is attached to one end of a cable 504. A coiled end 506 of the spring 500 abuts one end 508 of the carrier 502 and the other end 510 of the spring 500 hooks onto the edge of a slot 512 at the other end of the carrier at point 514 to provide a prestressed over-travel spring. The hooked end 510 also extends into an opening 516 of a pivotable level 518 and is engaged by the edge of the opening 516. When the force exerted by the cable 504 on the lever 518 exceeds the prestressed value of the over-travel spring 500, the carrier 502 will move relative to the lever 518 thus preventing damage or breakage of the automatic adjusting mechanism.

Although different over-travel spring arrangements have been illustrated in connection with a specific one of the various types of brakes illustrated, it is obvious that these arrangements are not limited to the specific type of brake with which they are illustrated.

In each of the above embodiments the over-travel spring has been pre-stressed between two fixed points on a rigid member. The advantage of this construction is that two fixed points on the rigid member may be spaced a predetermined distance within easily kept tolerances, thus providing for a spring arrangement with easily maintained tolerances wherein the spring is of a given minimum strength and a given length. The length of the over-travel spring is a factor in determining the position of the actuating lever relative to the serrated wheel. Since the length of the over-travel spring can be maintained easily within tolerances, the position of the actuating lever relative to the serrated wheel may be duplicated in mass production thus providing mass produced brake assemblies having automatic adjusters which will produce uniform results.

Although this invention has been illustrated and described in connection with specific embodiments, numerous other adaptations of this invention will become apparent to those skilled in the art. I intend to include within the scope of the following claims all equivalent applications of the invention whereby the same or substantially the same results will be obtained.

We claim:

1. For use in a brake assembly, an automatic adjusting mechanism comprising: an adjustable device comprising a rotatable element, a pivotable lever member having a portion operatively connected to said rotatable element for rotating the same, a force transmitting member for imparting a force on said lever for pivoting the same, means connecting said members, said connecting means comprising a rigid portion on one of said members, said rigid portion having an elongated opening therein, a pair of spaced portions on said rigid portion, one of said spaced portions being located adjacent said opening, a coil spring received in said opening and being stretched between said spaced portions, said coil spring having a hooked end directly connected to said one spaced portion and the other end directly connected to the other of said spaced portions, said hooked end of said coil spring being operatively connected to the other of said members, said rigid portion being so constructed at said one spaced portion to allow relative movement between said hooked end of said coil spring and said rigid portion, whereby relative movement between said lever member and said force transmitting member will be effected when the force applied to said lever member by said force transmitting member exceeds a predetermined value fixed by said coil spring.

2. The structure as recited in claim 1 wherein said construction of said rigid portion allowing relative movement between said hooked end of said coil spring and said rigid portion is a guide slot separated from said opening, said one spaced portion is an innermost edge of said guide slot and said hooked end bears on said innermost edge.

3. The structure as recited in claim 2 wherein said rigid portion is integral with said lever member.

4. The structure as recited in claim 2 wherein: said rigid portion is secured to said force transmitting member, an opening is in said lever member, said hooked end of said coil spring extends through and engages the edge of said lever member opening.

5. For use in a brake assembly, an automatic adjusting mechanism comprising: an adjustable device comprising a rotatable element, a pivotable lever member having a portion operatively connected to said rotatable element for rotating the same, a force transmitting member for imparting a force on said lever member for pivoting the same, means connecting said members, said connecting means comprising an elongated rigid portion on one of said members, a coil spring surrounding said rigid portion and being stretched between a pair of spaced portions on said rigid portion, said coil spring having a hooked end directly connected to said rigid portion at one of said spaced portions and having the other end thereof directly connected to said rigid portion at the other of said spaced portions, said hooked end of said coil spring being operatively connected to the other of said members, said rigid portion being so constructed to allow relative movement between said hooked end of said coil spring and said rigid portion, whereby relative movement between said lever member and said force transmitting member will be effected when the force applied to said lever member by said force transmitting member exceeds a predetermined value fixed by said coil spring.

6. The structure as recited in claim 5 wherein said construction of said rigid portion allowing relative movement between said hooked end of said coil spring and said rigid porion is a guide slot and said one spaced portion of said rigid portion is the innermost edge of said guide slot and said hooked end bears on said innermost edge.

7. The structure as recited in claim 6 wherein: said rigid portion is secured to said force transmitting member, an opening is in said lever member, said hooked end of said coil spring extends through and engages the edge of said lever member opening.

8. In a brake assembly: a support, a pair of brake shoes slidably mounted on said support, means for actuating said brake shoes, said support having an anchor extending between one pair of ends of said brake shoes for engagement by said shoes, an adjusting device located on said anchor and comprising a rotatable serrated wheel, a lever member pivotally mounted on said anchor and having a portion engaging said serrated wheel for rotating the same, a cable member fixed at one end to one of said brake shoes and operatively connected to the other of said brake shoes intermediate the ends thereof, a rigid portion on said lever member, a resilient element stretched between and directly attached to said rigid portion at two spaced points thereon, one end of said resilient element being directly attached to the other end of said cable member, a space in said rigid portion adjacent to said other end of said cable member and receiving said one end of said resilient element providing for relative movement between said one end of said resilient element and said rigid portion, whereby relative movement between said lever member and said cable member will be effected when the force applied to said lever member by said cable member exceeds a predetermined value fixed by said resilient element.

9. A brake assembly comprising: a support, a pair of brake shoes slidably mounted on said support, actuating means between each pair of adjacent ends of said brake shoes, anchoring means adjacent each end of each of said brake shoes, one of the anchoring means for each of said brake shoes having a rotatable serrated wheel thereon engaged by a respective brake shoe in shoe released position, a pair of lever members each pivotally mounted on a respective one of said anchor means and having a portion engaging its respective serrated wheel for rotating the same, a pair of cable members each connected at one end to a stationary part of the brake and operatively connected to a respective shoe intermediate the ends thereof, a rigid portion fixedly secured to the other end of a respective one of said cable members, a resilient element stretched between and attached to said rigid portion at two spaced points thereon, one end of said resilient element being directly attached to a respective lever member, a space provided on said rigid portion located adjacent to said lever member and receiving said one end of said resilient member thereby providing for relative movement between said one end of said resilient member and said rigid portion, whereby relative movement of said cable member and its respective lever member will be effected when the force transmitted by said cable member exceeds a predetermined amount fixed by said resilient element.

10. For use in a brake assembly, an automatic adjusting mechanism comprising: an adjustable device comprising a rotatable element, a pivotable lever member having a portion operatively connected to said rotatable element for rotating the same, a cable member for imparting a force on said lever for pivoting the same, a rigid portion on said lever member, a resilient element stretched between and having the ends thereof directly connected to said rigid portion at two spaced points thereon, one end of said resilient element being directly connected to said cable member, said rigid portion being so constructed to allow relative movement between said one end of said resilient element and said rigid portion, whereby relative movement between said lever member and said cable member will be effected when the force applied to said lever member by said cable member exceeds a predetermined value fixed by said resilient element.

11. For use in a brake assembly, an automatic adjusting mechanism comprising: an adjustable device comprising a rotatable element, a pivotable lever member having a portion operatively connected to said rotatable element for rotating the same, a force transmitting member for imparting a force on said lever for pivoting the same, a rigid portion fixedly secured to said force transmitting member, a pair of spaced portions on said rigid portion, a resilient element stretched between and having one end directly connected to said rigid portion at one spaced portion and the other end directly connected to the other spaced portion, said one end of said resilient element being operably connected to said lever member, said rigid portion being so constructed at said one spaced portion allowing for relative movement between said one end of said resilient element and said rigid portion, whereby relative movement between said lever member and said force transmitting member will be effected when the force applied to said lever member by said force transmitting member exceeds a predetermined value fixed by said resilient element.

12. For use in a brake assembly, an automatic adjusting mechanism comprising: an adjustable device comprising a rotatable element, a pivotable lever member having a portion operatively connected to said rotatable element for rotating the same, a force transmitting member for imparting a force on said lever for pivoting the same, a rigid portion fixedly secured to said force transmitting member, a pair of spaced portions on said rigid portion, one of said portions being located adjacent said lever member, a resilient element stretched between and having one end directly connected to said rigid portion at said one spaced portion and the other end directly connected to the other spaced portion, said one end of said resilient element being directly connected to said lever member, said rigid portion being so constructed at said one spaced portion to allow for relative movement between said one end of said resilient element and said rigid portion, whereby relative movement between said lever member and said force transmitting member will be effected when the force applied to said lever member by said force transmitting member exceeds a predetermined value fixed by said resilient element.

13. In a brake assembly: a support, a pair of brake shoes slidably mounted on said support for actuating said brake shoes, said support having an anchor extending between one pair of ends of said brake shoes for engagement by said ends in shoe released position, an adjustable strut extending between the other ends of said brake shoes, said adjustable strut having a rotatable serrated wheel for extending said strut, a lever member pivotally mounted on one of said shoes adjacent said other end thereof and having a portion engaging said serrated wheel for rotating the same, a cable member fixed at one end to a stationary part of the brake and operatively connected to said one shoe intermediate the ends thereof, a rigid portion fixedly secured to the other end of said cable, a pair of spaced portions on said rigid portion, one of said spaced portions being located adjacent said lever member, a resilient element stretched between and having one end directly connected to said rigid portion at said one spaced portion and the other end directly connected to said rigid portion at the other spaced portion, said one end of said resilient element being directly connected to said lever member, said rigid portion being so constructed at said one spaced portion to allow relative movement between said one end of said resilient element and said rigid portion, whereby relative movement between said cable member and said lever member will be effected when the force transmitted by said cable member to said lever member exceeds a predetermined amount fixed by said resilient member.

14. The structure as recited in claim 13 wherein: said construction of said rigid portion allowing relative movement between said one end of said resilient element and said rigid portion is a guide slot and said one spaced portion of said rigid portion is the innermost edge of said guide slot.

15. The structure as recited in claim 14 wherein: said resilient element is a coil spring, said rigid portion has an elongated opening therein receiving said coil spring, said one end of said spring is hook shaped and bears on said innermost edge of said guide slot, and said innermost edge is adjacent said opening.

References Cited by the Examiner

UNITED STATES PATENTS

| | | | |
|---|---|---|---|
| 3,034,602 | 5/62 | Bauman | 188—79.5 |
| 3,034,603 | 5/62 | Bauman | 188—79.5 |
| 3,050,157 | 8/62 | Kenzik et al. | 188—79.5 |
| 3,103,992 | 9/63 | Dombeck | 188—79.5 |

FOREIGN PATENTS 612,360  11/48  Great Britain.

ARTHUR L. LA POINT, *Primary Examiner.*

DUANE A. REGER, *Examiner.*

UNITED STATES PATENT OFFICE
CERTIFICATE OF CORRECTION

Patent No. 3,216,533                          November 9, 1965

Sidney E. Hagerty et al.

It is hereby certified that error appears in the above numbered patent requiring correction and that the said Letters Patent should read as corrected below.

Column 4, line 29, after "end" insert -- 240 --; line 62, for "134" read -- 234 --.

Signed and sealed this 20th day of September 1966.

(SEAL)
Attest:

ERNEST W. SWIDER                          EDWARD J. BRENNER
Attesting Officer                             Commissioner of Patents